(12) United States Patent
Miyairi et al.

(10) Patent No.: US 10,495,072 B2
(45) Date of Patent: Dec. 3, 2019

(54) THERMOACOUSTIC ENERGY CONVERTING ELEMENT PART, THERMOACOUSTIC ENERGY CONVERTER, AND METHOD OF MANUFACTURING THERMOACOUSTIC ENERGY CONVERTING ELEMENT PART

(71) Applicant: NGK Insulators, Ltd., Nagoya-Shi (JP)

(72) Inventors: Yukio Miyairi, Nagoya (JP); Shinichi Miwa, Tagimi (JP)

(73) Assignee: NGK Insulators, Ltd., Nagoya (JP)

( * ) Notice: Subject to any disclaimer, the term of this patent is extended or adjusted under 35 U.S.C. 154(b) by 654 days.

(21) Appl. No.: 14/605,005

(22) Filed: Jan. 26, 2015

(65) Prior Publication Data
US 2015/0226188 A1    Aug. 13, 2015

(30) Foreign Application Priority Data

Feb. 10, 2014   (JP) ................................ 2014-023594

(51) Int. Cl.
*F03G 7/00*    (2006.01)
*B23K 20/02*   (2006.01)
(Continued)

(52) U.S. Cl.
CPC ............ *F03G 7/002* (2013.01); *B23K 20/002* (2013.01); *B23K 20/023* (2013.01);
(Continued)

(58) Field of Classification Search
CPC .................. F03G 7/002; B23K 20/023; F25B 2309/1402–1412; B32B 2038/0016;
(Continued)

(56) References Cited

U.S. PATENT DOCUMENTS 4,114,380 A    9/1978  Ceperley
8,043,418 B2 * 10/2011  Ruud ................... B01D 53/228
                                                454/237
(Continued)

FOREIGN PATENT DOCUMENTS

FR      2 956 200 A1    8/2011
JP      2012-237295    12/2012
(Continued)

OTHER PUBLICATIONS

Extended European Search Report (Application No. 15153464.1) dated Oct. 20, 2015.

*Primary Examiner* — Keith M Raymond
*Assistant Examiner* — Webeshet Mengesha
(74) *Attorney, Agent, or Firm* — Burr & Brown, PLLC

(57) ABSTRACT

The thermoacoustic energy converting element part includes a plurality of through holes extending along a uniform direction to penetrate a body of the thermoacoustic energy converting element part to form traveling paths of acoustic waves. The element part includes a wall surrounding each of the through holes to extend in an extending direction of the through hole and configured to exchange heat between the fluid. The through hole includes a through hole that has a hydraulic diameter of 0.4 mm or smaller, and an open area ratio of the through holes is 60% or higher. A first layer and a second layer are alternately provided on the wall of the thermoacoustic energy converting element part along the extending direction. A porosity of the first layer is 0% or smaller than a porosity of the second layer. The thermal conductivity of the structure of the thermoacoustic energy converting element part along the extending direction is 2 W/m/K or lower. If a metal plate is provided as the first layer, a plurality of the metal plates having a roughened main surface is layered and bonded by thermocompression (Continued)

bonding to manufacture the thermoacoustic energy converting element part.

21 Claims, 5 Drawing Sheets

(51) Int. Cl.
- *B23K 20/00* (2006.01)
- *B32B 15/04* (2006.01)
- *B32B 15/18* (2006.01)
- *B32B 37/24* (2006.01)
- *B32B 38/00* (2006.01)

(52) U.S. Cl.
CPC ............ *B32B 15/043* (2013.01); *B32B 15/18* (2013.01); *B32B 38/0036* (2013.01); *B32B 2037/243* (2013.01); *B32B 2038/0016* (2013.01); *B32B 2255/06* (2013.01); *B32B 2255/20* (2013.01); *B32B 2307/302* (2013.01); *B32B 2307/538* (2013.01); *B32B 2311/00* (2013.01); *B32B 2315/02* (2013.01)

(58) Field of Classification Search
CPC ......... B32B 15/011–018; B32B 15/043; B32B 2307/302; B32B 2307/538; B32B 2255/06; B32B 2255/20; F02G 2243/54
See application file for complete search history.

(56) References Cited

U.S. PATENT DOCUMENTS

| | | | | |
|---|---|---|---|---|
| 2008/0072607 | A1* | 3/2008 | Haberbusch | F25B 9/145 |
| | | | | 62/6 |
| 2013/0068273 | A1* | 3/2013 | Kanno | H01L 35/32 |
| | | | | 136/224 |
| 2013/0270936 | A1* | 10/2013 | Mayor | H02K 9/19 |
| | | | | 310/54 |

FOREIGN PATENT DOCUMENTS

| | | | | |
|---|---|---|---|---|
| JP | 2012237295 | * | 12/2012 | ............... F03G 7/00 |
| WO | WO2014141658 | * | 9/2014 | |

* cited by examiner ( ⌇ HEAT TRANSFER)

THERMOACOUSTIC ENERGY CONVERTING ELEMENT PART, THERMOACOUSTIC ENERGY CONVERTER, AND METHOD OF MANUFACTURING THERMOACOUSTIC ENERGY CONVERTING ELEMENT PART

FIELD

The present invention relates to a thermoacoustic energy converting element part that converts acoustic energy into thermal energy or converts thermal energy into acoustic energy between the fluid, through which acoustic waves travel, and a wall in contact with the fluid, a thermoacoustic energy converter, and a method of manufacturing a thermoacoustic energy converting element part.

BACKGROUND

At present, from the viewpoint of conservation of the global environment, such technique is desired which can efficiently utilize the energy that used to be wasted. In particular, a technique that can convert wasted energy into mechanical energy is desired. For example, a Rankine bottoming cycle which generates steam to rotate a turbine, a Sterling cycle system using waste heat, a thermoelectric conversion system using a thermoelectric conversion element part, and a thermoacoustic system converting thermal energy into acoustic energy are known.

The thermoacoustic system uses a thermoacoustic conversion technique for exchanging energy between acoustic energy (sound pressure energy) and thermal energy. The system uses a compression process and an expansion process in a fluid element of a fluid in which acoustic waves travel. Specifically, the technique uses the behavior of the compression process and the expansion process in the fluid element taking place at different locations (along the traveling direction of acoustic waves) for longitudinal oscillations (acoustic waves).

Example thermoacoustic systems using the thermoacoustic conversion technique include a system with an apparatus having a sufficient contact area between a solid part and gas, where one end of the solid part is heated and a portion of heat is converted into acoustic energy which is supplied to the electric power generator. The key feature of the system is the temperature gradient in the solid part of the apparatus, though the efficiency of converting energy into acoustic wave energy is disadvantageously low. The disadvantage is due to an undesirable structure and property of the thermoacoustic energy converting element part configured to convert thermal energy into sound pressure energy.

As an example of the thermoacoustic energy converting element part used in the thermoacoustic system, a thermoacoustic stack is known that is made compact to generate self-excited oscillation even with high frequency under low temperature difference (JP 2012-237295A).

The thermoacoustic stack includes a plurality of through holes and is made of a material having thermal conductivity lower than 10 W/m·K. For a shorter stack length, the temperature gradient can be scaled down (proportionally reduced) so that the temperature at a high temperature side heat exchanging unit, which is required to generate a critical temperature gradient, can be reduced.

By using the aforementioned stack, the required temperature for the high temperature side heat exchanging unit to achieve the critical temperature gradient can efficiently be reduced. At present, however, the efficiency of energy conversion between acoustic waves and heat is still low.

An object of the present invention is to provide a thermoacoustic energy converting element part that can efficiently convert acoustic energy to thermal energy or thermal energy to acoustic energy between the fluid, through which acoustic waves travel, and a wall in contact with the fluid, a thermoacoustic energy converter, and a method of manufacturing a thermoacoustic energy converting element part.

SUMMARY

There is provided with a thermoacoustic energy converting element part configured to convert acoustic energy into thermal energy or thermal energy into acoustic energy between a fluid in which acoustic waves travel and a wall in contact with the fluid, the thermoacoustic energy converting element part including a wall which surrounds each of through holes provided in a body of the element part, extending in a direction, and configured for acoustic waves travelling routes, the wall extending in an extending direction of the through holes and configured to exchange heat with a fluid in the through holes, wherein the through holes include a through hole that has a hydraulic diameter of 0.4 mm or smaller, an open area ratio of the plurality of through holes in the thermoacoustic energy converting element part is 60% or higher, the thermoacoustic energy converting element part is a multilayered structure including a first layer and a second layer that are alternately layered along the extending direction of the through holes, the first layer having a porosity of 0% or a porosity smaller than a porosity of the second layer and the wall including the first layer and the second layer that are alternately provided along the extending direction, and a structure of the thermoacoustic energy converting element part has thermal conductivity along the extending direction of 2 W/m/K or lower.

The second layer is preferably made of a material different from a material of the first layer.

The first layer preferably includes a metal layer.

The second layer preferably includes an oxide layer of a metal of the first layer.

Alternately, the second layer preferably includes a ceramic layer.

The second layer preferably has a porosity of 10 to 50%.

The thermal conductivity is preferably 20% or lower of a thermal conductivity of a material of the first layer.

Further, a ceramic coating layer is preferably provided on an inner surface of the wall surrounding each of the through holes of the multilayered structure.

There is also provided with a method of manufacturing a thermoacoustic energy converting element part configured to convert acoustic energy into thermal energy or thermal energy into acoustic energy between a fluid in which acoustic waves travel and a wall in contact with the fluid, the method including:

forming a plurality of metal plates each having main surfaces on both sides provided with openings of a plurality of through holes;

applying a roughening process to the main surfaces of each of the metal plates;

positioning and layering, after the roughening process, the plurality of metal plates so as to align the openings with each other to form a metal plate assembly; and bonding the metal plate assembly by thermocompression bonding to form, between adjacent metal plates, a layer including pores.

Preferably, the metal plate is made of stainless steel, and the metal plate temperature is 1050 to 1150° C. in a process of bonding the metal plate assembly by thermocompression bonding.

There is also provided with a method of manufacturing a thermoacoustic energy converting element part configured to convert acoustic energy into thermal energy or thermal energy into acoustic energy between a fluid in which acoustic waves travel and a wall in contact with the fluid, the method including:

forming a plurality of metal plates each having main surfaces on both sides provided with openings of a plurality of through holes;

applying a ceramic material to the main surfaces of each of the metal plates;

positioning and layering, after applying the ceramic material, the plurality of metal plates so as to align the openings with each other to form a metal plate assembly; and heat-treating the metal plate assembly to form a ceramic layer between adjacent metal plates.

The method preferably further including forming a ceramic coating layer on an inner surface of the wall surrounding the through holes by dipping the manufactured thermoacoustic energy converting element part in a dispersed slurry including ceramic powder.

The thermoacoustic energy converting element part preferably includes a wall which surrounds each of through holes provided in a body of the element part, extending in a direction, and configured for acoustic waves travelling routes, the wall extending in an extending direction of the through holes and configured to exchange heat with a fluid in the through holes, the through holes include a through hole that has a hydraulic diameter of 0.4 mm or smaller, an open area ratio of the plurality of through holes in the thermoacoustic energy converting element part is 60% or lower, the thermoacoustic energy converting element part is a multilayered structure including a first layer and a second layer that are alternately layered along the extending direction of the through holes where the first layer has a porosity of 0% or a porosity smaller than a porosity of the second layer and the wall includes the first layer and the second layer that are alternately provided along the extending direction, and a structure of the thermoacoustic energy converting element part has thermal conductivity along the extending direction of 2 W/m/K or lower.

There is also provided with a thermoacoustic energy converter including:

a thermoacoustic energy converting element part configured to amplify acoustic energy in a fluid using heat of a wall in contact with the fluid, the thermoacoustic energy converting element part including a wall which surrounds each of through holes provided in a body of the element part, extending in a direction, and configured for acoustic waves travelling routes, the wall extending in an extending direction of the through holes and configured to exchange heat with a fluid in the through holes;

a guide tube forming a traveling path of acoustic waves traveling in the fluid and configured to guide the acoustic waves in the through holes such that the acoustic waves travel along the extending direction of the through holes in the thermoacoustic energy converting element part; and a pair of heat exchanging units provided on both ends of the thermoacoustic energy converting element part and configured to generate temperature gradient along the extending direction between both ends of the thermoacoustic energy converting element part, the guide tube including an output end, the output end being configured to output acoustic waves having acoustic energy amplified by the temperature gradient and to be coupled to a converter configured to convert the amplified acoustic energy into other form of energy from the output acoustic waves, wherein the through holes include a through hole that has a hydraulic diameter of 0.4 mm or smaller, an open area ratio of the plurality of through holes in the thermoacoustic energy converting element part is 60% or higher, the thermoacoustic energy converting element part is a multilayered structure including a first layer and a second layer that are alternately layered along the extending direction of the through holes where the first layer has a porosity of 0% or a porosity smaller than a porosity of the second layer and the wall includes the first layer and the second layer alternately provided along the extending direction, and a structure of the thermoacoustic energy converting element part has thermal conductivity along the extending direction of 2 W/m/K or lower.

There is also provided with a thermoacoustic energy converter including:

a thermoacoustic energy converting element part configured to generate, using acoustic energy of a fluid, temperature gradient on a wall in contact with the fluid, the thermoacoustic energy converting element part including a wall which surrounds each of through holes provided in a body of the element part, extending in a direction, and configured for acoustic waves travelling routes, the wall extending in an extending direction of the through holes and configured to exchange heat with a fluid in the through holes;

a guide tube forming a traveling path of acoustic waves traveling in the fluid and configured to guide the acoustic waves in the through holes such that the acoustic waves travel along the extending direction of the through holes in the thermoacoustic energy converting element part;

a heat exchanging unit provided on one of ends of the thermoacoustic energy converting element part and configured to be kept at a constant temperature; and a heat output unit provided on the other end of the thermoacoustic energy converting element part and configured to provide, by using a temperature gradient generated by traveling of the acoustic waves between both the ends of the thermoacoustic energy converting element part, a temperature different from the temperature of the heat exchanging unit, wherein the through holes include a through hole that has a hydraulic diameter of 0.4 mm or smaller, an open area ratio of the plurality of through holes in the thermoacoustic energy converting element part is 60% or higher, the thermoacoustic energy converting element part is a multilayered structure including a first layer and a second layer that are alternately layered along the extending direction of the through holes where the first layer has a porosity of 0% or a porosity smaller than a porosity of the second layer and the wall includes the first layer and the second layer alternately provided along the extending direction, and a structure of the thermoacoustic energy converting element part has thermal conductivity along the extending direction of 2 W/m/K or lower.

The thermoacoustic energy converting element part and the thermoacoustic energy converter have a large contact area between fluid and a wall where a large number of through holes can be provided. Efficient thermoacoustic energy conversion can be performed between the fluid, in which acoustic waves travel, and the wall in contact with the fluid. Furthermore, the thermoacoustic energy converting element part can precisely be manufactured by a method of manufacturing a thermoacoustic energy converting element part.

DETAILED DESCRIPTION

As described above, the efficiency of energy conversion between acoustic waves and heat of thermoacoustic systems available at present is still low. Therefore, it is preferable to perform efficient energy conversion between acoustic waves in a fluid and a wall in contact with the fluid. To further improve the efficiency of energy conversion between acoustic waves and heat, preferable measures are to be taken, that is, reducing thermal conductivity of the wall along the through hole to keep temperature gradient along the through hole in the wall, increasing the contact area between the fluid, in which acoustic waves travel for exchanging energy, and the wall, and precisely forming a large number of parallel through holes to avoid disturbing the traveling of acoustic waves. Considering such measures, a thermoacoustic energy converter can be obtained as described below.

A thermoacoustic energy converting element part, a thermoacoustic energy converter, and a method of manufacturing a thermoacoustic energy converting element part will be described in detail.

Thermoacoustic Energy Converter 10

Figure 1:
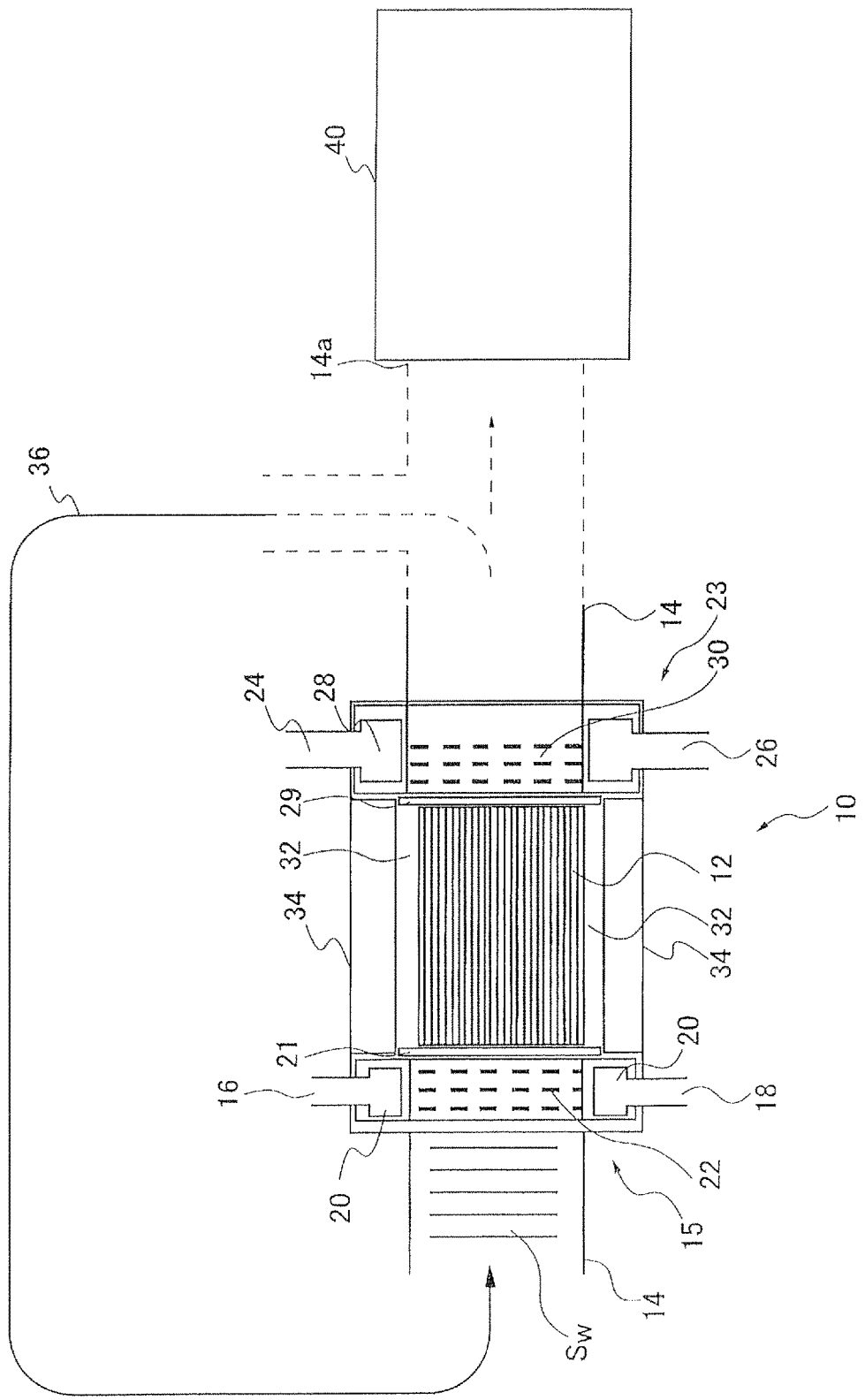
FIG. 1 illustrates an example configuration of a thermoacoustic energy converter according to an embodiment in which a thermoacoustic energy converting element part according to the embodiment is used.

FIG. 1 illustrates an example configuration of a thermoacoustic energy converter 10 according to an embodiment in which a thermoacoustic energy converting element part according to the embodiment is used. The thermoacoustic energy converter 10 illustrated in FIG. 1 is an apparatus configured to amplify the sound pressure energy of acoustic waves traveling in a guide tube and to covey the amplified sound pressure energy to a converting unit 40 that converts the amplified sound pressure energy into other form of energy. The converting unit 40 may be, for example, an electric power generator configured to convert sound pressure energy into electrical energy or an apparatus configured to convert sound pressure energy into thermal energy. The generator generates electromagnetic induction to produce electromotive force by oscillating a coil or a magnet as a power generating element, by acoustic waves. The converting unit that converts sound pressure energy into thermal energy is used, for example, as a cooling device that cools a cooling medium by converting sound pressure energy into thermal energy.

The thermoacoustic energy converter 10 is an apparatus that amplifies the sound pressure energy of an entering acoustic wave Sw in the thermoacoustic energy converting element part and outputs the resulting acoustic wave having amplified sound pressure energy. The thermoacoustic energy converter 10 can output acoustic waves having significantly large sound pressure energy by, for example, amplifying the small sound pressure energy of the acoustic wave Sw in the thermoacoustic energy converting element part and repeating this amplification by circulating to input the acoustic waves having amplified sound pressure energy to the thermoacoustic energy converting element part. In an initial stage where the acoustic wave Sw having small sound pressure energy is generated, the thermoacoustic energy converter 10 selectively amplifies a portion of noises in the sound in the guide tube 14 that has a frequency determined by the shape and dimensions of the thermoacoustic energy converter 10. The acoustic wave Sw having small sound pressure energy is generated by self-excitation.

As illustrated in FIG. 1, the thermoacoustic energy converter 10 includes a thermoacoustic energy converting element part 12, the guide tube 14, and heat exchanging units 15 and 23 as main parts.

The thermoacoustic energy converting element part 12 converts acoustic energy to thermal energy or vice versa between the fluid, in which the acoustic wave Sw travels, and the wall in contact with the fluid. The thermoacoustic energy converting element part 12 is provided with a plurality of through holes extending in a uniform direction to form traveling routes of the acoustic wave Sw as will be described below. That is, the thermoacoustic energy converting element part 12 has a body formed in a pillar shape, such as a column or a square pillar, and provided with a large number of through holes on the body extending along the axial direction in parallel to each other. The thermoacoustic energy converting element part 12 is made of, for example, metals or ceramics.

The guide tube 14 contains a fluid and forms a traveling path of the acoustic wave Sw traveling in the fluid. The guide tube 14 guides the acoustic wave Sw to the through holes so that the acoustic wave Sw travels along the extending direction of the through holes in the thermoacoustic energy converting element part 12. The guide tube 14 is, for example, a metal tube. As for the fluid contained in the guide tube 14, gases are preferably used, for example, hydrogen gas or helium gas. The gas is hermetically contained in the guide tube 14 and controlled to a certain pressure of, for example, a few atmospheres to a few tens of atmospheres. As illustrated in dashed lines in FIG. 1, the guide tube 14 forms a circulation path 36 in which the acoustic wave Sw circulates through the thermoacoustic energy converting element part 12. The guide tube 14 includes an output end 14a coupled to a converting unit 40 that converts the amplified sound pressure energy in the acoustic wave Sw into another form of energy other than sound pressure energy. Although the guide tube 14 forms the circulation path 36 in the embodiment, the guide tube 14 may not form a circulation path.

The heat exchanging unit 15 is a low temperature portion provided to one of ends of the thermoacoustic energy converting element part 12 to keep the end of the thermoacoustic energy converting element part 12 at a low temperature. Hereinafter, the heat exchanging unit 15 is referred to as, with the same reference sign, low temperature portion 15. The heat exchanging unit 23 is a high temperature portion provided to the other end of the thermoacoustic energy converting element part 12 to keep the other end of the thermoacoustic energy converting element part 12 at a high temperature. Hereinafter, the heat exchanging unit 23 is referred to as, with the same reference sign, high temperature portion 23. With the low temperature portion 15 and the high temperature portion 23, a temperature gradient is generated between both the ends of the thermoacoustic energy converting element part 12 along the wall of the through hole provided in the thermoacoustic energy converting element part 12, that is, along the extending direction of the through holes.

The low temperature portion 15 includes a supply tube 16 for supplying a low temperature medium such as gas or liquid to the low temperature portion 15, an ejection tube 18 for ejecting the medium from the low temperature portion 15, and an annular tube 20 provided between the supply tube 16 and the ejection tube 18 to annularly surround the traveling path of the acoustic wave Sw. The supply tube 16 is coupled to a cooling source (not illustrated). The annular tube 20 is coupled to the supply tube 16 and the ejection tube 18. The annular tube 20 is in contact with a metal member 21 having high thermal conductivity. The metal member 21 is in contact with the thermoacoustic energy converting element part 12. The heat exchanged at the end of the thermoacoustic energy converting element part 12 via the metal member 21 flows from the end of the thermoacoustic energy converting element part 12 to the low temperature portion 15. In this manner, the end of the thermoacoustic energy converting element part 12 in contact with the metal member 21 is cooled. The low temperature portion 15 has a cooling fin 22 to cool the fluid contained in the guide tube 14. The cooling fin 22 coupled to the annular tube 20 absorbs heat from the fluid at the low temperature portion 15 to reduce the temperature of the fluid.

The high temperature portion 23 includes a supply tube 24 for supplying a high temperature medium such as gas or liquid to the high temperature portion 23, an ejection tube 26 for ejecting the medium from the high temperature portion 23, and an annular tube 28 provided between the supply tube 24 and the ejection tube 26 to annularly surround the traveling path of the acoustic wave Sw. The supply tube 24 is coupled to a heat source (not illustrated). The annular tube 28 is coupled to the supply tube 24 and the ejection tube 26. The annular tube 28 is in contact with a metal member 29 having high thermal conductivity. The metal member 29 is in contact with the thermoacoustic energy converting element part 12. The heat is exchanged between the end of the thermoacoustic energy converting element part 12 and the high temperature portion 23 via the metal member 29, and the end of the thermoacoustic energy converting element part 12 is heated with heat flowing from the high temperature portion 23. The high temperature portion 23 has a heating fin 30 to heat the fluid contained in the guide tube 14. The heating fin 30 coupled to the annular tube 28 supplies heat to the fluid at the high temperature portion 23 to raise the temperature of the fluid at the heating fin 30.

An insulation member 32 is provided on the outer periphery of the thermoacoustic energy converting element part 12 to suppress heat transfer of the thermoacoustic energy converting element part 12. A casing 34 is provided on the outer periphery of the insulation member 32 with a gap between the casing 34 and the insulation member 32.

The thermoacoustic energy converting element part 12 can thus keep the temperature gradient generated by the low temperature portion 15 and the high temperature portion 23. The operation of the thermoacoustic energy converting element part 12 of the thermoacoustic energy converter 10 will be described below.

Thermoacoustic Energy Converter 110

Figure 2:
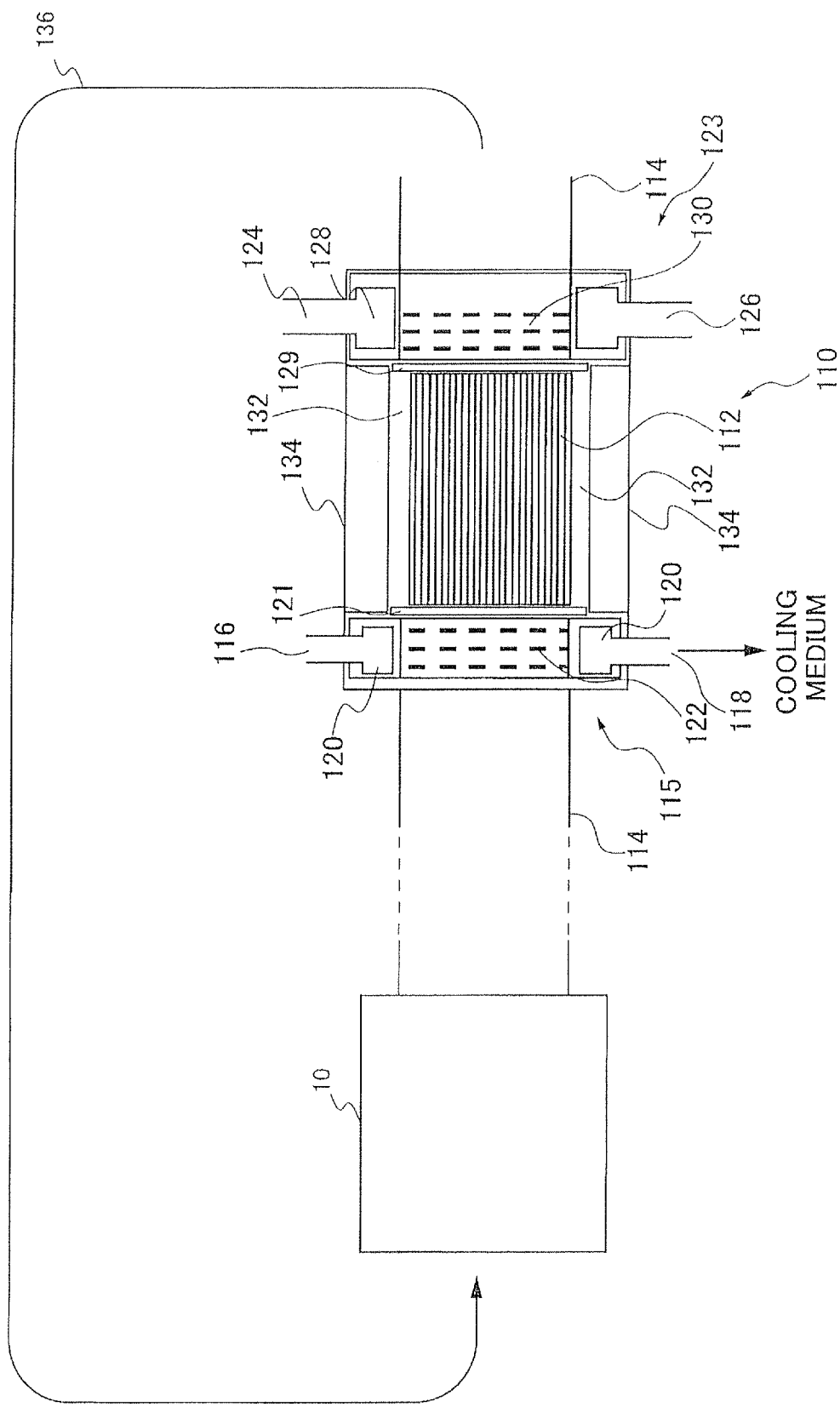
FIG. 2 illustrates an example configuration of a thermoacoustic energy converter according to another embodiment different from the thermoacoustic energy converter illustrated in FIG. 1.

FIG. 2 illustrates an example configuration of a thermoacoustic energy converter 110 according to another embodiment different from the thermoacoustic energy converter 10. The thermoacoustic energy converter 110 illustrated in FIG. 2 is an apparatus configured to convert sound pressure energy of acoustic waves traveling in the guide tube into thermal energy.

As illustrated in FIG. 2, the thermoacoustic energy converter 110 includes a thermoacoustic energy converting element part 112, a guide tube 114, a heat exchanging unit 123, and a heat output unit 115 as main parts. The heat output unit 115 provides a temperature different from that of the heat exchanging unit 123, in other words, the heat output unit 115 outputs a cooled medium (gas or liquid) for cooling.

The thermoacoustic energy converter 110 is coupled, via the guide tube 114, to the thermoacoustic energy converter 10 which outputs acoustic waves. The thermoacoustic energy converter 110 according to the embodiment is coupled to the thermoacoustic energy converter 10, although the thermoacoustic energy converter 110 may be coupled to other devices that generate acoustic waves.

The guide tube 114 and the heat exchanging unit 123 have the configuration identical to the guide tube 14 and the heat exchanging unit 23, respectively, which are illustrated in FIG. 1.

The guide tube 114 contains a fluid and forms a traveling path of acoustic waves traveling in the fluid. The guide tube 114 guides the acoustic waves to the through hole in the thermoacoustic energy converting element part 112 so that the acoustic waves travel along the extending direction of the through holes. The guide tube 114 is, for example, a metal tube. As for the fluid contained in the guide tube 114, gases are used, for example, hydrogen gas or helium gas. The gas is hermetically contained in the guide tube 114 and controlled to a certain pressure of, for example, a few atmospheres to a few tens of atmospheres. As illustrated in FIG. 2, the guide tube 114 forms a circulation path 136 in which acoustic waves circulate through the thermoacoustic energy converting element part 112. Although the guide tube 114 forms the circulation path 136 in the embodiment, the guide tube 114 may not form a circulation path.

The heat exchanging unit 123 includes a supply tube 124 for supplying a constant-temperature medium such as gas or liquid to the heat exchanging unit 123, an ejection tube 126 for ejecting the medium from the heat exchanging unit 123, and an annular tube 128 provided between the supply tube 124 and the ejection tube 126 to annularly surround the traveling path of the acoustic waves. The supply tube 124 is coupled to a heat source kept at a certain temperature (not illustrated). The annular tube 128 is coupled to the supply tube 124 and the ejection tube 126. The annular tube 128 is in contact with a metal member 129 having high thermal conductivity. The metal member 129 is in contact with the thermoacoustic energy converting element part 112. Heat is exchanged, via the metal member 129, between one end of the thermoacoustic energy converting element part 112 and the heat exchanging unit 123, and the temperature at the end of the thermoacoustic energy converting element part 112 becomes identical to the temperature of the heat exchanging unit 123. The heat exchanging unit 123 has a fin 130 to keep the fluid contained in the guide tube 114 at a certain temperature. The fin 130 coupled to the annular tube 128 supplies heat to the fluid at the heat exchanging unit 123 to keep the fluid at the fin 130 at a certain temperature.

An insulation member 132 is provided on the outer periphery of the thermoacoustic energy converting element part 112 to suppress heat transfer from the thermoacoustic energy converting element part 112. A casing 134 is provided on the outer periphery of the insulation member 132 with a gap between the casing 134 and the insulation 132. The thermoacoustic energy converting element part 112 can thus keep the temperature gradient generated by acoustic waves. The operation of the thermoacoustic energy converting element part 112, which performs conversions between acoustic waves and heat, of the thermoacoustic energy converter 110 will be described below.

The heat output unit 115 is provided at one of ends of the thermoacoustic energy converting element part 112. By using the temperature gradient generated in the thermoacoustic energy converting element part 112 by the traveling acoustic waves, the heat output unit 115 provides a temperature different from that of the heat exchanging unit 123. The temperature gradient is formed between the heat output unit 115 and the heat exchanging unit 123 which is kept at a certain temperature.

The heat output unit 115 includes a supply tube 116 for supplying a medium such as gas or liquid, an ejection tube 118 for ejecting the medium from the heat output unit 115, and an annular tube 120 provided between the supply tube 116 and the ejection tube 118 to annularly surround the traveling path of acoustic waves. The annular tube 120 is coupled to the supply tube 116 and the ejection tube 118. The annular tube 120 is in contact with a metal member 121 having high thermal conductivity. The metal member 121 is in contact with the thermoacoustic energy converting element part 112. The annular tube 120 exchanges heat with an end of the thermoacoustic energy converting element part 112 via the metal member 121, and the heat flows from the heat output unit 115 to the end of the thermoacoustic energy converting element part 112, thereby cooling the annular tube 120. The medium flowing in the annular tube 120 is output as a cooing medium. The cooling medium is used in devices for cooling. The heat output unit 115 has a cooling fin 122 to cool the fluid contained in the guide tube 114. The cooling fin 122 coupled to the annular tube 120 absorbs heat in the fluid at the heat output unit 115 to reduce the temperature of the fluid.

In the thermoacoustic energy converter 110, the thermoacoustic energy converting element part 112 converts the sound pressure energy of acoustic waves into thermal energy. The operation of the thermoacoustic energy converting element part 12 and the thermoacoustic energy converting element part 112, that is, the conversion between sound pressure energy and thermal energy will be described below.

Thermoacoustic Energy Converting Element Part

Figure 3:
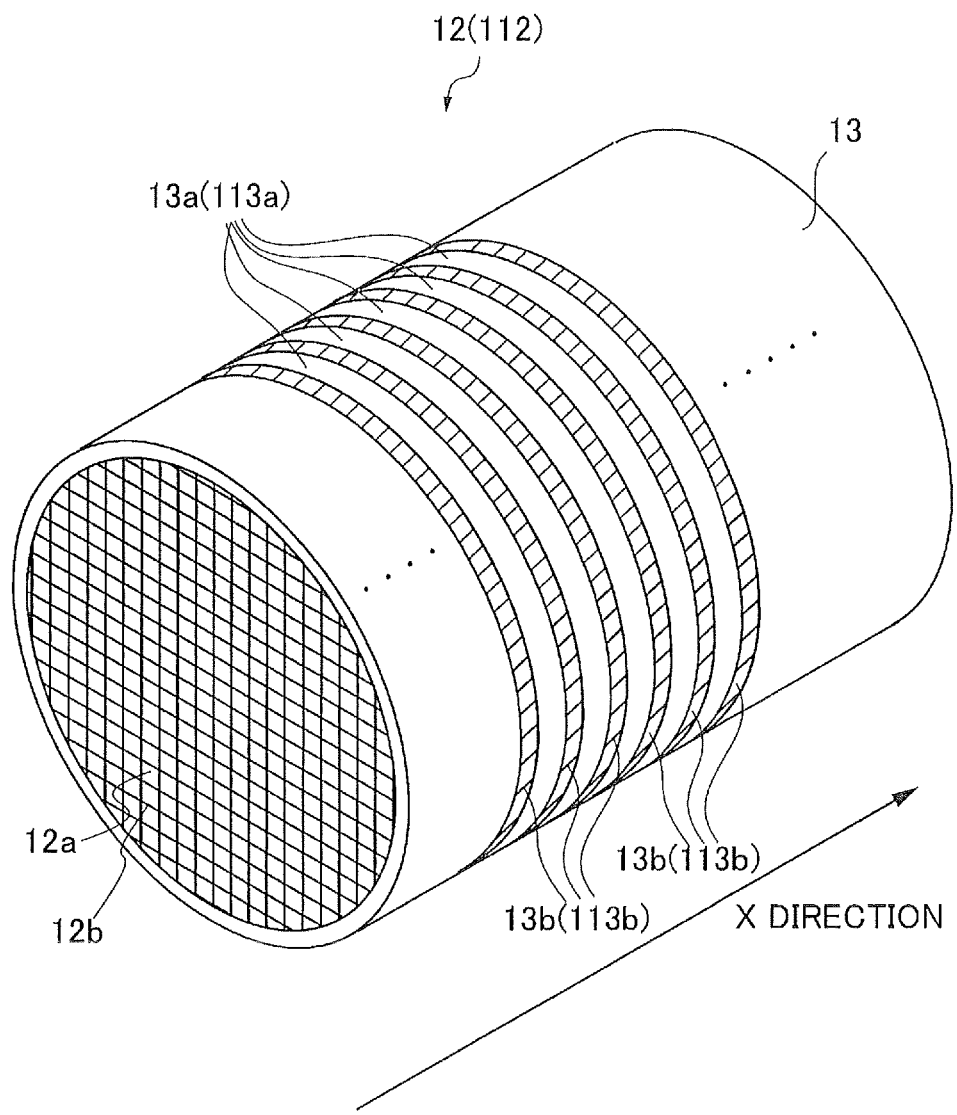
FIG. 3 is an external perspective view of an example thermoacoustic energy converting element part according to the embodiment.

Since the thermoacoustic energy converting element part 12 and the thermoacoustic energy converting element part 112 have the identical configuration, the thermoacoustic energy converting element part 12 will representatively be described. FIG. 3 is an external perspective view of the thermoacoustic energy converting element part 12.

The thermoacoustic energy converting element part 12 is provided with a plurality of through holes 12a extending along a uniform direction to penetrate a body of the thermoacoustic energy converting element part 12 to form traveling routes of acoustic waves. The thermoacoustic energy converting element part 12 has a wall 12b surrounding each of the plurality of through holes 12a and extending along the extending direction of the through hole 12a (along X direction in FIG. 3). The wall 12b exchanges heat with a fluid as will be described later. In FIG. 3, the wall 12b is simply illustrated in lines.

The length of the thermoacoustic energy converting element part 12 in X direction is determined according to a wavelength of acoustic waves generated in the guide tube 14 or a longitudinal oscillatory displacement of fluid. For example, the length is preferably 10 mm or longer and shorter than 500 mm. If the length is within this range, the length is identical to the displacement of the longitudinal oscillation of a fluid element generated by acoustic waves, and energy conversion can be performed efficiently.

Figure 4A:
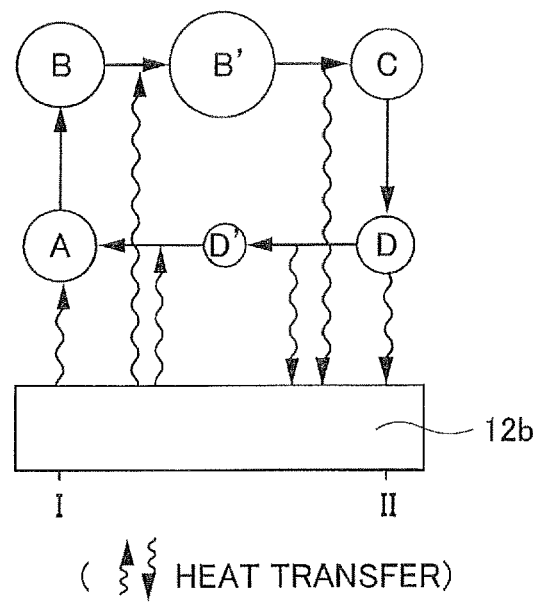
FIGS. 4A and 4B explain conversion between sound pressure energy and thermal energy in the thermoacoustic energy converting element part.
Figure 4B:
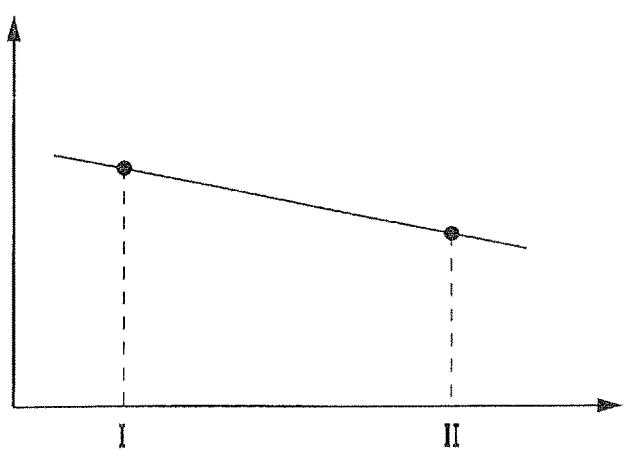

FIGS. 4A and 4B explain conversion between sound pressure energy and thermal energy and heat transfer performed in the thermoacoustic energy converting element part 12.

The fluid is a medium that causes acoustic waves to travel and longitudinally oscillates. The relation between the displacement of the fluid and compression as well as expansion of the fluid caused by the longitudinal oscillation will be explained using a fluid element which is a very small portion of the fluid.

If the acoustic wave is a traveling wave, the fluid element is incessantly subject to compression and expansion as acoustic waves travel in the fluid. The location of the fluid element along the wall 12b in X direction is different for compression and expansion, that is, the location changes as the fluid longitudinally oscillates.

FIG. 4A illustrates one cycle of compression and expansion of the traveling wave that has a phase difference of a quarter of the cycle period between the sound pressure of the acoustic waves and the displacement of the fluid element. In advance, one of ends of the wall 12b (at location I) is externally heated and the other end of the wall 12b (at location II) is externally cooled to generate a temperature gradient in the wall 12b as illustrated in FIG. 4B. The fluid element at the location I along the wall 12b is under the expansion process, that is, under state A. The fluid element continues the expansion to become state B. During the process, the fluid element receives heat from the high-temperature wall 12b. The fluid element under the state B then starts to move toward the location II along the wall 12b and becomes the most expanded state B'. Under the state B', the fluid element starts compression and becomes state D. During the process, the fluid element supplies heat to the low-temperature wall 12b. The fluid element under the state D then starts to move toward the location I and becomes the most compressed state D'. During the process, the fluid element supplies heat to the wall 12b. As the fluid element receives heat from the wall 12b during the expansion process and the wall 12b takes out heat from the fluid element during the compression process, compression and expansion of the fluid element can be enhanced. By generating the temperature gradient, in advance, in the thermoacoustic energy converting element part 12, the sound pressure energy of the acoustic waves traveling through the thermoacoustic energy converting element part 12 can be amplified.

In contrast, when no temperature gradient is generated on the wall 12b, the heat is supplied from the fluid element, which raises its temperature during the compression process, to the wall 12b and the fluid element takes out heat from the wall 12b during the expansion process, which result in generation of a temperature gradient opposite to that in FIG. 4B, in the wall 12b. The thermoacoustic energy converting element part 112 can provide a low temperature or a high temperature using the temperature gradient generated by the sound pressure energy of the acoustic waves traveling through the thermoacoustic energy converting element part 112. For example, the temperature gradient is generated between the location I and the location II along the wall 12b by the acoustic waves. If one of the location I and the location II is controlled to be at a constant temperature, the temperature gradient can provide a temperature, different from the constant temperature, at the other location. The thermoacoustic energy converting element part 112 can provide a low temperature or a high temperature using the temperature gradient generated by the sound pressure energy of the acoustic waves traveling through the thermoacoustic energy converting element part 112.

The circulation paths 36 and 136 are preferably formed in order that the cycle can be repeated several times, where the aforementioned cycle is determined as one cycle.

The above description is representatively made for the traveling wave. As for the traveling wave, there is a phase difference of a quarter of the cycle period between the compression and expansion cycle of the fluid and the displacement cycle of the fluid element. The energy conversion between acoustic waves and heat is thus performed. In contrast, as for the standing wave, there is no phase difference between the cycle of compression and expansion of the fluid and the cycle of displacement of the fluid element, so that energy conversion is not likely to take place. As for the standing wave, however, by determining the frequency of acoustic waves considering a delay in energy conversion between the fluid and the wall, the conversion can be performed. The wavelength of the standing wave is determined by the length of the guide tubes 14 and 114 or the circulation paths 36 and 136, and the wavelength determines the frequency of the acoustic wave. That is, the frequency of the acoustic wave can be controlled by adjusting the length of the guide tubes 14 and 114 or the circulation paths 36 and 136. The delay in energy conversion is determined by thermal conductivity, density, and specific heat at constant pressure of the fluid and the size of the through holes.

To make the thermoacoustic energy converting element part 12 and the thermoacoustic energy converting element part 112 function efficiently, the energy conversion between acoustic waves and heat is preferably performed at several locations. Furthermore, it is preferable to generate a stable temperature gradient in the thermoacoustic energy converting element part 12 and the thermoacoustic energy converting element part 112.

Therefore, in the embodiment, the thermoacoustic energy converting element part 12 and the thermoacoustic energy converting element part 112 according to the embodiment are provided with through holes, in which the acoustic waves travel, that have a hydraulic diameter of 0.4 mm or smaller, and an open area ratio of the plurality of through holes of the thermoacoustic energy converting element part 12 and the thermoacoustic energy converting element part 112 is 60% or higher. The number of through holes having the hydraulic diameter of 0.4 mm or smaller is preferably 80% or more of the total number of through holes, in which the acoustic waves travel, in the thermoacoustic energy converting element part 12 and the thermoacoustic energy converting element part 112. Most preferably, every through hole, in which the acoustic waves travel, in the thermoacoustic energy converting element part 12 and the thermoacoustic energy converting element part 112 has a hydraulic diameter of 0.4 mm or smaller. The thermal conductivity of the structure of the thermoacoustic energy converting element part 12 and the thermoacoustic energy converting element part 112 along the extending direction of the through hole is 2 W/m/K or lower. As illustrated in FIG. 3, the main body 13 of the thermoacoustic energy converting element part 12 and the thermoacoustic energy converting element part 112 has a multilayered structure composed by alternately layering a first layer 13a having no pore and a second layer 13b having pores along the extending direction of the through hole 12a. Along the extending direction of the through hole, the first layer 13a and the second layer 13b are alternately provided on the wall surrounding the through hole.

Even if the first layer 13a has high thermal conductivity, the thermal conductivity of the wall structure composed of alternately disposed first layers 13a and second layers 13b along the extending direction of the through holes can be adjusted to 2 W/m/K or lower, by providing suitable pores in the second layer 13b. The thermal conductivity of the material along the extending direction of the wall is preferably 5 W/m/K or lower. The thermal conductivity is kept low to properly keep the temperature gradient generated in the thermoacoustic energy converting element part 12 and the thermoacoustic energy converting element part 112. If the thermal conductivity is high, the temperature gradient between both ends of the thermoacoustic energy converting element part 12 and the thermoacoustic energy converting element part 112 produces heat flux that moderates the temperature gradient, which results in decrease in energy conversion between acoustic waves and heat. The low limit of the thermal conductivity is, for example, 0.2 W/m/K.

The thermal conductivity can be calculated by the temperature gradient method (the steady-state method) as described below. A TEST sample for measuring the thermal conductivity is sandwiched between spacers whose thermal conductivity is known. One of end faces of the sandwiching spacers is heated to 30 to 200° C. while the other end face is cooled to 20 to 25° C. to generate a steady temperature gradient along the thickness direction of the TEST sample. The heat flow is calculated from the temperature gradient in the spacer. The heat flow is divided by the temperature difference to obtain the thermal conductivity. More specifically, the thermoacoustic energy converting element part 12 or the thermoacoustic energy converting element part 112 having a diameter of 30 mm and a thickness of 30 mm is used as a TEST sample and a spacer having a diameter of 30 mm and a length of 150 mm made of stainless steel or copper is used. The temperature distribution in the spacer along the axial direction is measured to obtain the thermal conductivity along the extending direction of the through holes. Through this method, the thermal conductivity $\lambda$s of the structure is measured. The thermal conductivity of the material $\lambda$m is calculated by the expression $\lambda$s/(1−Ro), where Ro is an open area ratio. The open area ratio is calculated by the expression S2/(S1+S2), where S1 is an area of material portion and S2 is an area of opened portion. S1 and S2 are obtained from an image of the cross section (polished surface) perpendicular to the through holes, the image being photographed by a microscope. The material excludes the through holes but includes pores.

The hydraulic diameter of the through hole is set to 0.4 mm or smaller, because the upper limit of the thickness of the fluid that contributes to the energy conversion between the wall surrounding the through holes and the fluid is 0.2 mm. The hydraulic diameter of the through hole is thus set to 0.4 mm or smaller to improve the efficiency of energy conversion. The hydraulic diameter is a dimension expressed by 4·S/L mm, where L mm is the outer peripheral length of the cross sectional shape of each through hole and S mm² is the area of the cross sectional shape of each through hole, in which the cross sectional shape is taken perpendicular to the extending direction of the through holes. The hydraulic diameter of the through hole is preferably 0.2 to 0.3 mm. The hydraulic diameter of the through holes of 0.1 mm or smaller is not preferable because the frictional resistance between the fluid and the wall surrounding the through holes becomes large. The hydraulic diameter of the through holes is preferably 0.1 mm or larger.

By providing an open ratio of through holes of 60% or higher to the thermoacoustic energy converting element part 12 and the thermoacoustic energy converting element part 112, the energy conversion between the fluid, in which the acoustic waves travel, and the wall takes place at further larger number of locations, and thereby the contact area between the fluid and the wall 12b can be increased. The open area ratio is the ratio of the total cross sectional area of the through holes to the area inside the outer periphery of the cross section of the thermoacoustic energy converting element part 12 and the thermoacoustic energy converting element part 112 taken perpendicular to the X direction. If the open area ratio is lower than 60%, the area of the traveling routes in the thermoacoustic energy converting element part 12 and the thermoacoustic energy converting element part 112 steeply decreases, which may result in increase in dissipation of acoustic wave energy caused by viscosity of the fluid element. For this reason, the open area ratio is preferably 70% or higher, more preferably, 80% or higher. The upper limit of the open area ratio is, for example, 93%. The open area ratio is calculated by the expression S1/(S2+S2), where S1 is an area of material portion and S2 is an area of opened portion. S1 and S2 are obtained from an image of the cross section (polished surface) perpendicular to the through holes, the image being photographed by a microscope.

Although a material with no pore (porosity of 0%) is used for the first layer 13a of the thermoacoustic energy converting element part 12 and the thermoacoustic energy converting element part 112, a material with pores may be used. In this case, the porosity of the first layer 13a is smaller than the porosity of the second layer 13b. The thermoacoustic energy converting element part 12 and the thermoacoustic energy converting element part 112 are composed by alternately layering the first layer 13a and the second layer 13b to form a multilayered structure. The second layer 13b can be made of a material different from that of the first layer 13a to sufficiently reduce the thermal conductivity along the extending direction of the through holes. The thickness of the first layer 13a is, for example, 50 to 1000 μm and the thickness of the second layer 13b is 5 to 100 μm. Thus, in order to constitute the thermoacoustic energy converting element part 12 and the thermoacoustic energy converting element part 112 that are 10 mm long along the through holes, 5 to 200 of the first layers 13a and 5 to 200 of the second layers 13b are used. The first layer 13a preferably includes a metal layer such as a stainless steel layer so that the through holes can accurately be formed. The material of the metal layer, other than stainless steel, may be, but not limited to, carbon steel, pure iron, aluminum, titanium, nickel, chromium, alloys of aforementioned materials, or alloys of the materials including cobalt or manganese. The second layer 13b preferably includes an oxide of metals, such as stainless steel, used for the first layer, for serving as the second layer having high thermal conductivity. The porosity of the oxide is preferably 10 to 50% so that the thermoacoustic energy converting element part 12 and the thermoacoustic energy converting element part 112 can easily be manufactured while keeping the thermal conductivity within the preferable range. To obtain such configuration, for example, a plurality of metal plates provided with through holes and roughened main surfaces is formed to be used as the first layers 13a, and the plurality of metal plates is layered and bonded by thermocompression bonding to form metallic oxide layers, including pores, between the metal plates. This process will be described later. The metallic oxide layer forms the second layer 13b.

The porosity is calculated by the equation, porosity=Sp/(Sw+Sp), according to an image of the cross section, perpendicular to the through holes, of the region of the material to be measured, the image being photographed by a scanning electron microscope, where Sp is the total area of fine holes (pores) in a wall portion not including the area of the through holes and Sw is the total area of the wall portion not including the area of the through holes. If the calculated porosity varies in different locations, the porosity may be determined by averaging values of the porosity measured in ten cross sections at different locations.

It is preferable that the second layer 13b includes a ceramic layer to reduce thermal conductivity. The porosity of the ceramic layer is preferably 10 to 50% so that the thermoacoustic energy converting element part 12 and the thermoacoustic energy converting element part 112 can easily be manufactured while keeping the thermal conductivity within the preferable range. As for the ceramic layer, for example, a zirconia-based ceramic is used. To obtain such configuration, for example, a ceramic material is applied to the main surface of the metal plate provided with through holes, which serves as the first layer 13a, and the metal plates are layered and heat-treated to sinter the ceramic so that the ceramic layer is formed as the second layer 13b.

The thermal conductivity of the structure along the extending direction of the through holes of the thermoacoustic energy converting element part 12 and the thermoacoustic energy converting element part 112 is preferably 20% of the thermal conductivity of the material of the first layer 13a or lower, more preferably, 1% or lower of the thermal conductivity of the material of the first layer 13a. The thermal conductivity of the structure along the extending direction of the through holes of the thermoacoustic energy converting element part 12 and the thermoacoustic energy converting element part 112 is preferably, for example, 0.1% or higher of the thermal conductivity of the material of the first layer 13a. The thermal conductivity can be controlled by selecting a type, thickness, and porosity of the material of the second layer 13b.

The density (cell density) of the through holes is preferably within a range from 1600 cpsi (the number of through holes within one square inches [number of cells]) to 9000 cpsi. By increasing the density of through holes, the fluid loss occurring between the fluid and the wall can be suppressed.

The heat capacity of the material of the wall 12b at 400° C. in the thermoacoustic energy converting element part 12 and the thermoacoustic energy converting element part 112 is preferably 3 J/cc/K (the heat capacity of a portion of the wall 12b with a volume of 1 cc) or higher. Thus, the heat exchange between the wall and the fluid suppresses the change in temperature of the wall, and thereby the temperature gradient can be kept stable. If the heat capacity of the material of the wall 12b is below 3 J/cc/K, the temperature of the wall steeply decreases or increases by the heat exchange between the wall 12b and the fluid. Therefore, the heat capacity below 3 J/cc/K is not preferable to stably keep the temperature gradient. The upper limit of the heat capacity is, for example, 6 J/cc/K.

Specifically, the heat capacity of the material of the wall 12b at 400° C. in the thermoacoustic energy converting element part 12 and the thermoacoustic energy converting element part 112 can be calculated from the relation between the input calorie and the temperature rise, which are measured with an adiabatic calorimeter for a powdered or fragmented sample provided by cutting out and crushing a portion of the material.

The thermal expansion along the extending direction of the through holes of the thermoacoustic energy converting element part 12 and the thermoacoustic energy converting element part 112 under the temperature from 20 to 800° C. is preferably 6 ppm/K or smaller. The thermal stress in the thermoacoustic energy converting element part 12 and the thermoacoustic energy converting element part 112 can thus be reduced, which prevents damage caused by thermal strain. The thermal expansion along the extending direction of the through holes of the thermoacoustic energy converting element part 12 and the thermoacoustic energy converting element part 112 under the temperature from 20 to 800° C. is further preferably 3 ppm/K or smaller. The lower limit of the thermal expansion is, for example, 1 ppm/K. The thermal expansion along the extending direction of the through holes is measured according to JIS R1618-2002 "Measuring method of thermal expansion of fine ceramics by thermomechanical analysis".

On the inner face of the wall 12b surrounding each through hole of the multilayered structure of the thermoacoustic energy converting element part 12 and the thermoacoustic energy converting element part 112, a ceramic coating layer is preferably provided to prevent heat from dissipating inside from the surface of the wall 12b. By providing the ceramic coating layer, the thermal conductivity along the direction perpendicular to the extending direction of the through holes at the first layer 13a can be reduced by, for example, 30% or more, further preferably, 40% or more. For example, the thermal conductivity of the first layer 13a made of austenitic stainless steel is about 16 W/m/K, whereas the thermal conductivity of the structure having the open area ratio of 80% is 3.2 W/m/K. When the ceramic layer of cordierite is coated with the thickness of 10 μm on the surface of the wall 12b, the thermal conductivity of the structure of the first layer 13a along the direction perpendicular to the extending direction of the through holes can be set to 2 W/m/K or lower.

The cross sectional shape of each through hole provided in the thermoacoustic energy converting element part 12 and the thermoacoustic energy converting element part 112 is, for example, a polygonal shape such as a triangle, a square, and a hexagon. The cross sectional shape may be a combined shape of such polygonal shapes. On the inner surface of the wall 12b facing the through hole 12a, a rib (not illustrated) may be provided along the extending direction of the through holes 12a to protrude inside each through hole 12a. With the rib provided on the inner surface of the wall 12b, the contact area between the fluid, in which acoustic waves travel, and the wall 12b increases. The efficiency of conversion between sound pressure energy and thermal energy can thus be improved.

Method of Manufacturing Thermoacoustic Energy Converting Element Part

Figure 5:
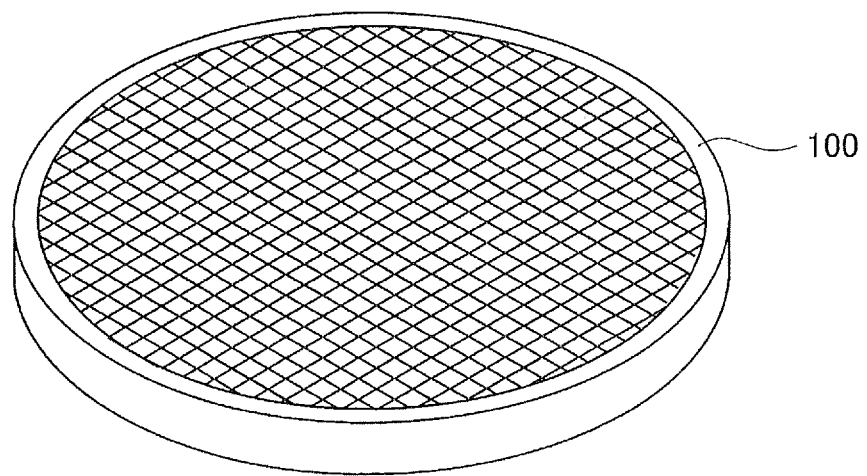
FIG. 5 illustrates an example metal plate used in manufacturing of the thermoacoustic energy converting element part according to the embodiment.

A method of manufacturing a thermoacoustic energy converting element parts 12 and 112 will be described below. FIG. 5 illustrates an example metal plate 100 used in manufacturing the thermoacoustic energy converting element parts 12 and 112.

A plurality of metal plates 100 each having openings of a plurality of through holes on both main surfaces is formed. The metal plate 100 is formed by photo-etching. Specifically, a metal plate having the thickness of, for example, 0.1 mm or smaller is cleaned, and then a photoresist film is applied on each of both the main surfaces of the metal plate. An original plate made of a film or glass having processing patterns to reproduce openings of the through holes and a pin hole for a locating pin that correspond to those of an end product, or the metal plate 100, is closely attached to the photoresist film applied to the metal plate. Through exposure and development, a mask is formed on the metal plate. An etching liquid is sprayed on the main surface of the masked metal plate to perform etching. The mask is removed and the metal plate 100 having openings of the through holes and the pin hole is obtained.

The main surface of each of the plurality of metal plates 100 thus obtained is subjected to a roughening process. The main surface of each metal plate 100 is roughened by the roughening process, for example, a process using a press forming die to mechanically form an irregularity, surface treatment by photo-etching, surface treatment using a plasma, or surface treatment using sand blasting. The roughening process is applied to the main surface of each metal plate 100 in order to form, between metal plates 100, a metallic oxide layer including pores as the second layer 13b of the main body 13 through thermocompression bonding performed to bond the plurality of layered metal plates 100, as will be described later. The metal plate 100 forms the first layer 13a of the main body 13. The porosity of the second layer 13b is controlled according to the degree of the surface roughness of the main surface of the metal plate 100, that is, the intensity of the processing or surface treatment during the roughening process. The face of the metal plate 100 to be roughened through the roughening process may be both of the main surfaces or one of the main surfaces. Both of the main surfaces or either of the main surfaces may be roughened to control the irregularity of the opposing main surfaces of layered metal plates 100, thereby controlling the porosity of the second layer 13b.

After the roughening process, the plurality of metal plates is positioned and layered so that the openings of the through holes are approximately aligned each other between the metal plates to compose the metal plate assembly. In particular, a pin is inserted in a pin hole (not illustrated) formed in each metal plate 100 to position and layer the plurality of metal plates 100 so that the openings of the through holes are approximately aligned each other between the metal plates. The metal plate assembly is thus composed.

The metal plate assembly is then bonded by thermocompression bonding to form a layer including pores between adjacent metal plates. The thermoacoustic energy converting element parts 12 and 112 are thus manufactured. The thermocompression bonding of the metal plate assembly is performed under, for example, hydrogen atmosphere in a furnace at a predetermined temperature. For example, when the metal plate 100 is made of stainless steel such as austenitic stainless steel, the temperature of the metal plate 100 is preferably held at 1050 to 1150° C. The metal plate assembly is held under, for example, 1100° C. for 15 minutes under a pressure of, for example, 300 to 2000 atmospheres to be bonded.

In the embodiment, the metal plate 100 with the roughened main surface is bonded by thermocompression bonding. Instead of roughening the main surface, the second layer 13b including pores can be formed between the adjacent first layers 13a in the thermoacoustic energy converting element parts 12 and 112 by heat-treating the metal plate assembly composed of layered metal plates, whose main surfaces are not roughened, under a temperature lower than the temperature for the thermocompression bonding by 30 to 50° C.

In the embodiment, the metal plates 100 with roughened surfaces are bonded together by thermocompression bonding to form the second layer 13b including pores between the adjacent first layers 13a. The second layer 13b may also include a ceramic layer. In this case, instead of roughening the main surface of the metal plate 100, a ceramic material is applied to the main surface of the metal plate 100 and the metal plates 100 are layered to form a metal plate assembly followed by being heat-treated to sinter the ceramic material.

In this case, the thermoacoustic energy converting element parts 12 and 112 are manufactured through the following procedure. A plurality of metal plates 100 each having openings of a plurality of through holes on both main surfaces is formed. The ceramic material is applied to the main surface of each of the metal plates 100. A plurality of metal plates with the ceramic material applied thereto is positioned and layered so that the openings are approximately aligned each other between the metal plates 100 to form the metal plate assembly. The metal plate assembly is then heat-treated to form a ceramic layer between adjacent metal plates. The thermoacoustic energy converting element parts 12 and 112 are thus manufactured. As for the ceramic material, for example, a zirconia-based ceramic material is used.

The thermoacoustic energy converting element parts 12 and 112 thus manufactured are dipped in a dispersed slurry including ceramic powder to form a ceramic coating layer on the inner face of the wall 12b surrounding each through hole of the thermoacoustic energy converting element parts 12 and 112. This process is preferable in that the hydraulic diameter of the through hole and the thermal conductivity of the structure along the through hole can be reduced. The ceramic coating layer is formed of, for example, zirconia, alumina, cordierite, ceria, mullite, and aluminum titanate. The metal forming the metal plate 100, other than stainless steel, may be, but not limited to, carbon steel, pure iron, aluminum, titanium, nickel, chromium, alloys of aforementioned materials, or alloys of the materials including cobalt or manganese.

With the method of manufacturing according to the embodiment, the layered structure of the thermoacoustic energy converting element parts 12 and 112 can be manufactured from a plurality of metal plates including a large number of through holes. Therefore, the thermoacoustic energy converting element parts 12 and 112 provided with a large number of parallel through holes formed with accurate dimensions can efficiently be manufactured.

Exemplary Experiment

Various types of thermoacoustic energy converting element parts are manufactured to investigate energy conversion between the fluid and the wall in the thermoacoustic energy converting element part according to the embodiment.

To calculate the efficiency of energy conversion, acoustic waves are converted into electricity in a linear generator at the output end 14a of the thermoacoustic energy converter 10 illustrated in FIG. 1, and the generated power W J/sec is measured. Meanwhile, an input calorie Q J/sec at a high temperature side heat exchanging unit that is transferred to the system is calculated by the equation of $Q = \Delta T \cdot Cp \cdot M$, where $\Delta T$ is the temperature difference of the gas between the input port and the output port of the high temperature side heat exchanging unit, M kg/sec is the flow rate of the gas, and Cp J/kg/K is a specific heat of the gas. The conversion efficiency $\eta$ is calculated by the equation of $\eta = W/Q$. The efficiency of 20% or higher is required for an acceptable element part.

The thermoacoustic energy converting element part 12 has a length of 30 mm in X direction. Helium gas is hermetically contained in the guide tube 14 and kept at 10 atmospheres. The low temperature portion 15 and the high temperature portion 23 of the thermoacoustic energy converting element part 12 are set to each temperature so as the end of the low temperature portion 15 to be 60° C. and the end of the high temperature portion 23 to be 500° C., respectively.

TABLE 1 shows energy conversion efficiency for each configuration. Hydraulic diameter, open area ratio, and thermal conductivity (the thermal conductivity of the structure along the extending direction of the through holes) in TABLE 1 are parameters already explained. The metal plate 100 formed of stainless steel with 100 μm thickness is provided as the first layer 13a, and the main surface is roughened to provide a porosity of 30% to form the second layer 13b. The thermoacoustic energy converting element part 12 is obtained that has the main body 13 which is the layered structure composed of approximately 300 first layers 13a and approximately 300 second layers 13b. Samples are prepared that are different in the thickness of the second layer 13b, or the thickness of the roughened region, and different in the porosity of the second layer 13b to provide different thermal conductivity. The hydraulic diameter of all the through holes in Exemplary Embodiments 1 to 10 and Comparative Examples 1 to 8 are set to the values listed in TABLE 1. In the Exemplary Embodiment 11, 20% of the total of the plurality of through holes have the hydraulic diameter of 0.35 mm, and the rest of the through holes have the hydraulic diameter of 0.5 mm. In the Exemplary Embodiment 12, 50% of the total of the plurality of through holes have the hydraulic diameter of 0.35 mm, and the rest of the through holes have the hydraulic diameter of 0.5 mm. In the Exemplary Embodiment 13, 80% of the total of the plurality of through holes have the hydraulic diameter of 0.35 mm, and the rest of the through holes have the hydraulic diameter of 0.5 mm. In the Exemplary Embodiment 14, 90% of the total of the plurality of through holes have the hydraulic diameter of 0.35 mm, and the rest of the through holes have the hydraulic diameter of 0.5 mm.

TABLE 1

| | Hydraulic Diameter [mm] | Open Area Ratio [%] | Thermal Conductivity [W/m/K] | Conversion Efficiency [%] |
|---|---|---|---|---|
| Exemplary Embodiment 1 | 0.2 | 80 | 0.5 | 30 |
| Exemplary Embodiment 2 | 0.3 | 80 | 0.5 | 25 |
| Exemplary Embodiment 3 | 0.4 | 80 | 0.5 | 22 |
| Comparative Example 1 | 0.5 | 80 | 0.5 | 8 |
| Comparative Example 2 | 0.6 | 80 | 0.5 | 5 |
| Comparative Example 3 | 1.0 | 80 | 0.5 | 2 |
| Exemplary Embodiment 4 | 0.3 | 60 | 0.5 | 20 |
| Exemplary | 0.3 | 70 | 0.5 | 25 |

TABLE 1-continued

| | Hydraulic Diameter [mm] | Open Area Ratio [%] | Thermal Conductivity [W/m/K] | Conversion Efficiency [%] |
|---|---|---|---|---|
| Embodiment 5 Exemplary | 0.3 | 80 | 0.5 | 30 |
| Embodiment 6 Comparative Example 4 | 0.3 | 25 | 0.5 | 3 |
| Comparative Example 5 | 0.3 | 35 | 0.5 | 5 |
| Comparative Example 6 | 0.3 | 55 | 0.5 | 8 |
| Exemplary Embodiment 7 | 0.3 | 80 | 0.5 | 30 |
| Exemplary Embodiment 8 | 0.3 | 80 | 1 | 25 |
| Exemplary Embodiment 9 | 0.3 | 80 | 1.5 | 22 |
| Exemplary Embodiment 10 | 0.3 | 80 | 2 | 20 |
| Comparative Example 7 | 0.3 | 80 | 3 | 5 |
| Comparative Example 8 | 0.3 | 80 | 5 | 3 |
| Exemplary Embodiment 11 | 0.35 (20%) 0.5 (80%) | 80 | 0.5 | 21 |
| Exemplary Embodiment 12 | 0.35 (50%) 0.5 (50%) | 80 | 0.5 | 21 |
| Exemplary Embodiment 13 | 0.35 (80%) 0.5 (20%) | 80 | 0.5 | 24 |
| Exemplary Embodiment 14 | 0.35 (90%) 0.5 (10%) | 80 | 0.5 | 24 |

As can be understood by comparing Exemplary Embodiments 1 to 3 and Comparative Examples 1 to 3 shown in TABLE 1, the conversion efficiency is acceptable when the hydraulic diameter is 0.4 mm or smaller. By comparing Exemplary Embodiments 4 to 6 and Comparative Examples 4 to 6, the conversion efficiency is acceptable when the open area ratio of the through holes is 60% or higher. By comparing Exemplary Embodiments 7 to 10 and Comparative Examples 7 and 8, the conversion efficiency is acceptable when the thermal conductivity of the structure of the wall 12b along the extending direction of the through hole is 2 W/m/K or lower. Particularly, the conversion efficiency drastically improves when the thermal conductivity of the structure of the wall 12b is set to 1 W/m/K or lower.

It can be understood from Exemplary Embodiments 11 to 14 that, as the number of the through holes having the hydraulic diameter of 4 μm increases, the conversion efficiency improves, and when the number of through holes having the hydraulic diameter of 4 μm is set to be as much as 80% of the total number of the through holes or larger, the conversion efficiency drastically improves.

The thermoacoustic energy converting element part, the thermoacoustic energy converter, and the method of manufacturing a thermoacoustic energy converting element part according to the embodiment of the present invention are described above in detail. The present invention is not limited by the embodiments and exemplary embodiments described above. Various modifications and alterations can be made without departing from the spirit and the scope of the present invention.

REFERENCE SIGNS LIST 10 thermoacoustic energy converter
12, 112 thermoacoustic energy converting element part
12a through hole
12b wall
13a first layer
13b second layer
14, 114 guide tube
14a output end
15 heat exchanging unit (low temperature part)
16, 24, 116, 124 supply tube
18, 26, 118, 126 ejection tube
20, 28, 120, 128 annular tube
21, 29, 121, 129 metal member
22, 122 cooling fin
23 heat exchanging unit (high temperature part)
30 heating fin
32, 132 insulation member
34, 134 casing
36, 136 circulation path
40 converting unit
115 heat output unit
123 heat exchanging unit
130 fin

What is claimed is:

1. A thermoacoustic energy converting element part configured to convert acoustic energy into thermal energy or thermal energy into acoustic energy between a fluid in which acoustic waves travel and a wall in contact with the fluid,
the thermoacoustic energy converting element part comprising the wall which surrounds a plurality of through holes provided in a body of the thermoacoustic energy converting element part, the plurality of through holes extending from one end of the body to another end of the body and configured for acoustic waves travelling routes, the wall extending in an extending direction of the plurality of through holes and configured to exchange heat with a fluid in the through holes,
wherein the plurality of through holes include at least one through hole that has a hydraulic diameter of 0.4 mm or smaller,
an open area ratio of the plurality of through holes in the thermoacoustic energy converting element part is 60% or higher,
the thermoacoustic energy converting element part is a multilayered structure comprising a first layer and a second layer that are alternately layered along the extending direction of the plurality of through holes, the first layer having a porosity of 0% or a porosity smaller than a porosity of the second layer, the first layer and the second layer having stacking planes extending in a cross sectional direction of the thermoacoustic energy converting element part perpendicular to the extending direction of the plurality of through holes in the multilayer structure, with a normal direction of the stacking planes being in parallel with the extending direction of the plurality of through holes, and
a structure of the thermoacoustic energy converting element part has a thermal conductivity along the extending direction of 2 W/m/K or lower.

2. The thermoacoustic energy converting element part according to claim 1, wherein the second layer is made of a material different from a material of the first layer.

3. The thermoacoustic energy converting element part according to claim 1, wherein the first layer includes a metal layer.

4. The thermoacoustic energy converting element part according to claim 3, wherein the second layer includes an oxide layer of a metal of the first layer.

5. The thermoacoustic energy converting element part according to claim 1, wherein the second layer includes a ceramic layer.

6. The thermoacoustic energy converting element part according to claim 1, wherein the second layer has a porosity of 10 to 50%.

7. The thermoacoustic energy converting element part according to claim 1, wherein the thermal conductivity of the structure of the thermoacoustic energy converting element part is 20% or lower than a thermal conductivity of a material of the first layer.

8. The thermoacoustic energy converting element part according to claim 1, wherein a ceramic coating layer is provided on an inner surface of the wall surrounding each of the through holes of the multilayered structure.

9. A method of manufacturing a thermoacoustic energy converting element part configured to convert acoustic energy into thermal energy or thermal energy into acoustic energy between a fluid in which acoustic waves travel and a wall in contact with the fluid, the method comprising:
forming a plurality of metal plates each having main surfaces on both sides provided with openings of a plurality of through holes;
applying a roughening process to the main surfaces of each of the metal plates;
positioning and layering, after the roughening process, the plurality of metal plates so as to align the openings with each other to form a metal plate assembly; and
bonding the metal plate assembly by thermocompression bonding to form, between adjacent metal plates, a layer including pores,
wherein the plurality of through holes include at least one through hole that has a hydraulic diameter of 0.4 mm or smaller,
an open area ratio of the plurality of through holes in the thermoacoustic energy converting element part is 60% or higher,
the thermoacoustic energy converting element part is a multilayered structure comprising a first layer and a second layer that are alternately layered along the extending direction of the plurality of through holes, the first layer having a porosity of 0% or a porosity smaller than a porosity of the second layer, the first layer and the second layer having stacking planes extending in a cross sectional direction of the thermoacoustic energy converting element part perpendicular to the extending direction of the plurality of through holes in the multilayer structure, with a normal direction of the stacking planes being in parallel with the extending direction of the plurality of through holes, and
a structure of the thermoacoustic energy converting element part has a thermal conductivity along the extending direction of 2 W/m/K or lower.

10. The method of manufacturing a thermoacoustic energy converting element part according to claim 9, wherein the metal plate is made of stainless steel, and
the metal plate temperature is 1050 to 1150° C. in a process of bonding the metal plate assembly by thermocompression bonding.

11. The method of manufacturing a thermoacoustic energy converting element part according to claim 9, further comprising forming a ceramic coating layer on an inner surface of the wall surrounding the through holes by dipping the manufactured thermoacoustic energy converting element part in a dispersed slurry including ceramic powder.

12. The method of manufacturing a thermoacoustic energy converting element part according to claim 9, wherein
the thermoacoustic energy converting element part comprises a wall which surrounds each of through holes provided in a body of the element part, extending in a direction, and configured for acoustic waves travelling routes, the wall extending in an extending direction of the through holes and configured to exchange heat with a fluid in the through holes,
the through holes include a through hole that has a hydraulic diameter of 0.4 mm or smaller,
an open area ratio of the plurality of through holes in the thermoacoustic energy converting element part is 60% or lower,
the thermoacoustic energy converting element part is a multilayered structure comprising a first layer and a second layer that are alternately layered along the extending direction of the through holes where the first layer has a porosity of 0% or a porosity smaller than a porosity of the second layer and the wall includes the first layer and the second layer that are alternately provided along the extending direction, and
a structure of the thermoacoustic energy converting element part has thermal conductivity along the extending direction of 2 W/m/K or lower.

13. A method of manufacturing a thermoacoustic energy converting element part configured to convert acoustic energy into thermal energy or thermal energy into acoustic energy between a fluid in which acoustic waves travel and a wall in contact with the fluid, the method comprising:
forming a plurality of metal plates each having main surfaces on both sides provided with openings of a plurality of through holes;
applying a ceramic material to the main surfaces of each of the metal plates;
positioning and layering, after applying the ceramic material, the plurality of metal plates so as to align the openings with each other to form a metal plate assembly; and
heat-treating the metal plate assembly to form a ceramic layer between adjacent metal plates,
wherein the plurality of through holes include at least one through hole that has a hydraulic diameter of 0.4 mm or smaller,
an open area ratio of the plurality of through holes in the thermoacoustic energy converting element part is 60% or higher,
the thermoacoustic energy converting element part is a multilayered structure comprising a first layer and a second layer that are alternately layered along the extending direction of the plurality of through holes, the first layer having a porosity of 0% or a porosity smaller than a porosity of the second layer, the first layer and the second layer having stacking planes extending in a cross sectional direction of the thermoacoustic energy converting element part perpendicular to the extending direction of the plurality of through holes in the multilayer structure, with a normal direction of the stacking planes being in parallel with the extending direction of the plurality of through holes, and
a structure of the thermoacoustic energy converting element part has a thermal conductivity along the extending direction of 2 W/m/K or lower.

14. The method of manufacturing a thermoacoustic energy converting element part according to claim 13, further comprising forming a ceramic coating layer on an inner surface of the wall surrounding the through holes by dipping the manufactured thermoacoustic energy converting element part in a dispersed slurry including ceramic powder.

15. The method of manufacturing a thermoacoustic energy converting element part according to claim 13, wherein
    the thermoacoustic energy converting element part comprises a wall which surrounds each of through holes provided in a body of the element part, extending in a direction, and configured for acoustic waves travelling routes, the wall extending in an extending direction of the through holes and configured to exchange heat with a fluid in the through holes,
    the through holes include a through hole that has a hydraulic diameter of 0.4 mm or smaller,
    an open area ratio of the plurality of through holes in the thermoacoustic energy converting element part is 60% or lower,
    the thermoacoustic energy converting element part is a multilayered structure comprising a first layer and a second layer that are alternately layered along the extending direction of the through holes where the first layer has a porosity of 0% or a porosity smaller than a porosity of the second layer and the wall includes the first layer and the second layer that are alternately provided along the extending direction, and
    a structure of the thermoacoustic energy converting element part has thermal conductivity along the extending direction of 2 W/m/K or lower.

16. A thermoacoustic energy converter comprising:
    a thermoacoustic energy converting element part configured to amplify acoustic energy in a fluid using heat of a wall in contact with the fluid, the thermoacoustic energy converting element part comprising a wall which surrounds each of through holes provided in a body of the element part, extending in a direction, and configured for acoustic waves travelling routes, the wall extending in an extending direction of the through holes and configured to exchange heat with a fluid in the through holes;
    a guide tube forming a traveling path of acoustic waves traveling in the fluid and configured to guide the acoustic waves in the through holes such that the acoustic waves travel along the extending direction of the through holes in the thermoacoustic energy converting element part; and
    a pair of heat exchanging units provided on both ends of the thermoacoustic energy converting element part and configured to generate temperature gradient along the extending direction between both ends of the thermoacoustic energy converting element part, the guide tube including an output end, the output end being configured to output acoustic waves having acoustic energy amplified by the temperature gradient and to be coupled to a converter configured to convert the amplified acoustic energy into other form of energy from the output acoustic waves, wherein
    the through holes include a through hole that has a hydraulic diameter of 0.4 mm or smaller,
    an open area ratio of the plurality of through holes in the thermoacoustic energy converting element part is 60% or higher,
    the thermoacoustic energy converting element part is a multilayered structure comprising a first layer and a second layer that are alternately layered along the extending direction of the through holes where the first layer has a porosity of 0% or a porosity smaller than a porosity of the second layer and the wall includes the first layer and the second layer alternately provided along the extending direction, the first layer and the second layer having stacking planes extending in a cross sectional direction of the thermoacoustic energy converting element part perpendicular to the extending direction of the plurality of through holes in the multilayer structure, with a normal direction of the stacking planes being in parallel with the extending direction of the plurality of through holes, and
    a structure of the thermoacoustic energy converting element part has thermal conductivity along the extending direction of 2 W/m/K or lower.

17. A thermoacoustic energy converter comprising:
    a thermoacoustic energy converting element part configured to generate, using acoustic energy of a fluid, temperature gradient on a wall in contact with the fluid, the thermoacoustic energy converting element part comprising a wall which surrounds each of through holes provided in a body of the element part, extending in a direction, and configured for acoustic waves travelling routes, the wall extending in an extending direction of the through holes and configured to exchange heat with a fluid in the through holes;
    a guide tube forming a traveling path of acoustic waves traveling in the fluid and configured to guide the acoustic waves in the through holes such that the acoustic waves travel along the extending direction of the through holes in the thermoacoustic energy converting element part;
    a heat exchanging unit provided on one of ends of the thermoacoustic energy converting element part and configured to be kept at a constant temperature; and
    a heat output unit provided on the other end of the thermoacoustic energy converting element part and configured to provide, by using a temperature gradient generated by traveling of the acoustic waves between both the ends of the thermoacoustic energy converting element part, a temperature different from the temperature of the heat exchanging unit, wherein
    the through holes include a through hole that has a hydraulic diameter of 0.4 mm or smaller,
    an open area ratio of the plurality of through holes in the thermoacoustic energy converting element part is 60% or higher,
    the thermoacoustic energy converting element part is a multilayered structure comprising a first layer and a second layer that are alternately layered along the extending direction of the through holes where the first layer has a porosity of 0% or a porosity smaller than a porosity of the second layer and the wall includes the first layer and the second layer alternately provided along the extending direction, the first layer and the second layer having stacking planes extending in a cross sectional direction of the thermoacoustic energy converting element part perpendicular to the extending direction of the plurality of through holes in the multilayer structure, with a normal direction of the stacking planes being in parallel with the extending direction of the plurality of through holes, and
    a structure of the thermoacoustic energy converting element part has thermal conductivity along the extending direction of 2 W/m/K or lower.

18. The thermoacoustic energy converting element part according to claim 1, wherein the plurality of through holes include at least one through hole that has a hydraulic diameter of between 0.2 mm and 0.4 mm.

19. The thermoacoustic energy converting element part according to claim 1, wherein stacked layer surfaces of the first layer and the second layer in the multilayered structure are directed in the extending direction of the plurality of through holes.

20. The thermoacoustic energy converting element part according to claim 1, wherein a heat capacity of the wall is 3 J/cc/K or higher and 6 J/cc/K or lower.

21. The thermoacoustic energy converting element part according to claim 1, wherein a thermal expansion along the extending direction of the through holes of the thermoacoustic energy converting element part is 1 ppm/K or higher and 6 ppm/K or lower.

* * * * *